(12) United States Patent
Takato (10) Patent No.: US 6,867,924 B2
(45) Date of Patent: Mar. 15, 2005

(54) LARGE-APERTURE TELEPHOTO ZOOM LENS

(75) Inventor: Hideyasu Takato, Hino (JP)

(73) Assignee: Olympus Corporation, Tokyo (JP)

(*) Notice: Subject to any disclaimer, the term of this patent is extended or adjusted under 35 U.S.C. 154(b) by 0 days.

(21) Appl. No.: 10/633,622

(22) Filed: Aug. 5, 2003

(65) Prior Publication Data

US 2004/0042087 A1 Mar. 4, 2004

(30) Foreign Application Priority Data

Sep. 2, 2002 (JP) .......................................... 2002-257104

(51) Int. Cl.[7] .............................................. G02B 15/14
(52) U.S. Cl. ........................................ 359/676; 359/683
(58) Field of Search .................................. 359/676, 683, 359/684, 745–746, 672–675

(56) References Cited

U.S. PATENT DOCUMENTS

| | | | | |
|---|---|---|---|---|
| 4,269,484 A | * | 5/1981 | Laurent | ....................... 359/683 |
| 5,537,259 A | | 7/1996 | Ogawa | |
| 5,764,420 A | * | 6/1998 | Yahagi | ........................ 359/682 |
| 6,243,212 B1 | * | 6/2001 | Sanson et al. | .............. 359/676 |

FOREIGN PATENT DOCUMENTS

| | | |
|---|---|---|
| JP | 60-150020 | 8/1985 |
| JP | 2000-019398 | 1/2000 |

* cited by examiner

Primary Examiner—Jordan M. Schwartz
(74) Attorney, Agent, or Firm—Pillsbury Winthrop LLP

(57) ABSTRACT

A zoom lens includes, in order from an object side, a first lens unit with positive power; a second lens unit with positive power; and a third lens unit with negative power. When the magnification of the zoom lens is varied, extending from a wide-angle position to a telephoto position, spacings between the first lens unit and the second lens unit and between the second lens unit and the third lens unit become wider at the telephoto position than at the wide-angle position, and the third lens unit remains fixed. Thus, a telephoto zoom lens which has a large aperture and in which aberrations extending from infinity to a short distance are favorably corrected can be provided.

13 Claims, 4 Drawing Sheets

LARGE-APERTURE TELEPHOTO ZOOM LENS

BACKGROUND OF THE INVENTION

1. Field of the Invention

This invention relates to a large-aperture telephoto zoom lens applicable to an exchangeable lens for a silver halide film-type or digital single-lens reflex camera.

2. Description of Related Art

A number of telephoto zoom lenses have been proposed as exchangeable lenses for single-lens reflex cameras. Many of the telephoto zoom lenses are designed so that each zoom lens is constructed with four lens units having positive, negative, positive, and positive powers (refer to, for example, Japanese Patent Kokai No. 2000-19398, pp. 1–5, FIG. 1).

In most of telephoto zoom lenses such that a half angle of view ω is approximately 24° at a wide-angle position, that is, a focal length is about 100 mm in terms of a 35-mm film, and a variable magnification ratio is more than 3, an F-number is 4 or more at the wide-angle position. Furthermore, when an attempt is made to ensure brightness while increasing the focal length at a position closer to a telephoto position, a lens diameter and the entire lens length become oversized, and thus it is difficult to provide a telephoto zoom lens in which the variable magnification ratio is more than 3 and the F-number is small. In many of the telephoto zoom lenses, an object distance where it is short is nearly 1.5 m. A shorter object distance causes considerable fluctuation of spherical aberration, and it becomes difficult to increase the magnification of the zoom lens for photographing at a short distance.

SUMMARY OF THE INVENTION

The zoom lens according to the present invention includes, in order from the object side, a first lens unit with positive power, a second lens unit with positive power, and a third lens unit with negative power. When the magnification of the zoom lens is varied, spacings between the first lens unit and the second lens unit and between the second lens unit and the third lens unit become wider at the telephoto position than at the wide-angle position, and the third lens unit remains fixed.

Further, the zoom lens according to the present invention includes, in order from the object side, a first lens unit with positive power, a second lens unit with positive power, a third lens unit with negative power, a fourth lens unit with positive power, and a fifth lens unit with positive power. When the magnification of the zoom lens is varied, the first lens unit is moved and spacings between individual lens units are changed.

Still further, according to the present invention, the zoom lens, includes, in order from the object side, a first lens unit with positive power, a second lens unit with positive power, a third lens unit with negative power, a fourth lens unit with positive power, and a fifth lens unit with positive power. When the magnification of the zoom lens is varied, spacings between individual lens units are changed.

DETAILED DESCRIPTION OF THE PREFERRED EMBODIMENTS

Before undertaking the description of the embodiments, the function and effect of the present invention will be explained below.

According to the present invention, when the magnification of the zoom lens is varied, extending from the wide-angle position to the telephoto position, so that spacings between the first lens unit and the second lens unit and between the second lens unit and the third lens unit become wider at the telephoto position than at the wide-angle position, two lens units (the first and second lens units) with positive powers are shifted forward, and thereby a high variable magnification ratio can be ensured.

When the positive powers are shared between the two lens units (the first and second lens units), the third lens unit with negative power which is highly sensitive to a manufacturing error can be fixed, and aberration is favorably corrected.

Moreover, in the fourth and fifth lens units, when the positive power is imparted to each of them and spacings between the individual lens units are changed, power distribution can be optimized and aberration is favorably corrected.

In the present invention, the zoom lens is constructed with five lens units so that the powers of individual lens units are properly distributed, and thereby a large-aperture lens system is realized.

When the magnification is varied, extending from the wide-angle position to the telephoto position, the first lens unit is moved toward the object side. Thus, by ensuring the amount of movement of the first lens unit, it becomes possible to reduce the entire lens length as far as possible at the wide-angle position and to increase the variable magnification ratio.

In addition, when the zoom lens is designed so that spacings between the individual lens units are changed, power distribution can be optimized and aberration is favorably corrected.

In any arrangement of the zoom lens of the present invention, focusing is performed by the second lens unit alone. Where focusing is performed by a means other than the second lens unit, it is conceivable that the first and second lens units in which the fluctuation of aberration is minimized are integrally moved, or a nearly afocal system is constructed with the first to fourth lens units to move the last lens unit. However, the first lens unit, which is large in lens diameter, is heavy in weight, and when this lens unit is moved, a mechanical load is increased. In the technique that focusing is performed by the last lens unit, its lens diameter is small and weight is light, but there is the disadvantage that the fluctuation of spherical aberration or astigmatism is considerable.

According to the present invention, when focusing is performed by the second lens unit, the fluctuation of spherical aberration is heavier than in the case where the first and second lens units are integrally moved, but the fluctuation of aberration, such as the fluctuation of the image plane, is kept in a relatively moderate state. Consequently, the shortest focusing distance can be taken as short as 1 m. Furthermore, since the second lens unit, in contrast with the first lens unit, can be designed so that the lens diameter is reduced, the load of a driving mechanism is lessened.

In the zoom lens of the present invention, the first lens unit is corrected for chromatic aberration. In telephoto zoom, since the magnification of the entire system is high and chromatic aberration produced in the first lens unit is increased by rear lens units, there is the need to hold axial chromatic aberration produced here to a minimum. It is thus desirable that the focal length of the first lens unit is set within the limit of the following condition to be satisfied:

$$3 < f1/fw < 5 \quad (1)$$

where f1 is the focal length of the first lens unit and fw is the focal length of the entire system at the wide-angle position.

If the lower limit of Condition (1) is overstepped, the power of the first lens unit will be increased. Consequently, the amount of production of aberration is increased and it becomes difficult to correct the aberration in the second lens unit or any lens unit placed behind the second lens unit. Beyond the upper limit of Condition (1), the power of the first lens unit becomes too weak and the overall length must be increased, thereby causing oversizing of the entire system.

In order to correct chromatic aberration, anomalous dispersion glass is used for the first lens unit. By using this glass material within the limit of Condition (1) satisfied, axial chromatic aberration can be corrected more effectively.

Preferably, it is more favorable to satisfy the following condition:

$$3.3 < f1/fw < 4.8 \quad (1')$$

Preferably, it is most favorable to satisfy the following condition:

$$3.6 < f1/fw < 4.0 \quad (1'')$$

It is desirable that the second lens unit which is a focus lens unit satisfies the following condition:

$$2 < f2/fw < 3.5 \quad (2)$$

where f2 is the focal length of the second lens unit.

By satisfying Condition (2), the amount of focus movement is optimized.

Beyond the upper limit of Condition (2), the amount of focus shift is increased at the telephoto position, and it becomes difficult to ensure spacing for movement between the first lens unit and the second lens unit. Below the lower limit of Condition (2), the fluctuation of the image plane caused by focusing becomes heavy, which is unfavorably.

It is desirable that the third lens unit satisfies the following condition:

$$-0.16 < f3/ft < -0.08 \quad (3)$$

where f3 is the focal length of the third lens unit and ft is the focal length of the entire system at the telephoto position.

Within the limit of Condition (3) satisfied, it becomes easy to fulfil various conditions, such as the zoom ratio, the entire lens length, and the back focal length, and to favorably correct aberrations. In particular, this condition serves to correct curvature of field and distortion and also contributes to correction for spherical aberration and coma at the telephoto position.

Below the lower limit of Condition (3), spherical aberration is brought to a state of overcorrection. Beyond the upper limit of Condition (3), spherical aberration is in a state of undercorrection.

The above effect is further improved when Condition (3) is altered to the following condition:

$$-0.12 < f3/ft < -0.10 \quad (3')$$

It is desirable that the fourth lens unit and the fifth lens unit satisfy the following conditions (4) and (5), respectively:

$$0.1 < f4/ft < 0.4 \quad (4)$$

$$1.5 < f5/fw < 2.5 \quad (5)$$

where f4 is the focal length of the fourth lens unit and f5 is the focal length of the fifth lens unit.

Within the limits of Conditions (4) and (5) satisfied, it becomes easy to fulfil various conditions, such as the zoom ratio, the entire lens length, and the back focal length, and to favorably correct aberrations. In particular, the fluctuation of spherical aberration or coma caused by zooming can be favorably compensated.

In particular, Condition (4) chiefly has to do with correction for spherical aberration at the wide-angle position, and Condition (5) contributes to correction for coma over the entire zoom area.

Preferably, it is more favorable for the fourth lens unit to satisfy the following condition:

$$0.1 < f4/ft < 0.38 \quad (4')$$

Preferably, it is most favorable to satisfy the following condition:

$$0.1 < f4/ft < 0.35 \quad (4'')$$

Preferably, it is more favorable for the fifth lens unit to satisfy the following condition:

$$1.7 < f5/fw < 2.5 \quad (5')$$

Preferably, it is most favorable to satisfy the following condition:

$$1.9 < f5/fw < 2.5 \quad (5'')$$

Furthermore, when the anomalous dispersion glass is used for the fourth lens unit and the fifth lens unit, both axial chromatic aberration and chromatic aberration of magnification can be corrected in good balance. When the anomalous dispersion glass is placed before and behind a stop interposed between the fourth lens unit and the fifth lens unit, its effect is further enhanced.

As a large-aperture zoom lens, it is desirable to satisfy the following condition in the entire area:

$$2.0 < F < 4.0 \quad (6)$$

where F is an F-number.

A lens system exceeding the upper limit of Condition (6) is no longer suitable for the name of a large-aperture lens. Below the lower limit of Condition (6), extreme oversizing of the lens system is caused, and the value of product is impaired.

The telephoto lens of the present invention is capable of possessing the characteristic of a macro lens at the telephoto position. For this purpose, it is desirable to satisfy the following condition:

$$-0.35 \leq MG \leq -0.15 \quad (7)$$

where MG is the maximum magnification for photography.

For the maximum magnification of the macro lens, it is desirable to satisfy Condition (7), and a magnification such as not to exceed, at least, the upper limit of Condition (7) is required. In order to achieve the magnification below the lower limit of Condition (7), the number of lenses or the F-number must be increased.

In the present invention, since an image circle is nearly half of that in 135F, photographing can be performed at the magnification nearly twice that in 135F, and when the telephoto lens is used for such photographing, macro photographing can be performed even at a considerable distance away from an object.

Preferably, it is more favorable to satisfy the following condition:

$$-0.35 \leq MG \leq -0.21 \quad (7')$$

Preferably, it is most favorable to satisfy the following condition:

$$-0.35 \leq MG \leq -0.24 \quad (7'')$$

Focusing, as mentioned above, is performed by moving the second lens unit toward the object side, and it is desirable that the amount of movement in this case is set within the limit of the following condition to be satisfied:

$$0.08 < \Delta d/ft < 0.12 \quad (8)$$

where $\Delta d$ is the amount of movement in focusing extending from infinity to the nearest object point.

The power of the second lens unit is defined by Condition (2), but when it is within the limit of Condition (2), the amount of shift beyond the lower limit of Condition (8) becomes necessary. Below the lower limit of Condition (8), photographing can no longer be performed within the limit that the upper limit of Condition (7) is not exceeded, and the telephoto lens ceases to be satisfactory as the macro lens. Beyond the upper limit of Condition (8), a macro photographing magnification is increased, but the amount of movement is also increased, which is unfavorable for mechanical construction. Moreover, the spacing between the first lens unit and the second lens unit must be widened to ensure the amount of movement, with the result that the entire lens length is increased.

In the lens system of the present invention, it is desirable to satisfy the following conditions:

$$10 < IH < 13 \quad (9)$$

$$2.8 < fb/IH < 3.8 \quad (10)$$

where IH is the radius of the image circle and fb is a distance from the last lens surface to the image plane at the wide-angle position.

Conditions (9) and (10) define a space required for placing a quick-return mirror. Condition (9) offers a possible limit of the radius of the image circle to be assumed. In this case, a dimension required for ensuring the space of layout in which the mirror is placed exists in the limit of Condition (10). Below the lower limit of each of Conditions (9) and (10), the space for the mirror becomes insufficient. Beyond the upper limit of each of Conditions (9) and (10), a camera body becomes bulky, which is unfavorable.

In the lens system of the present invention, it is further desirable to satisfy the following condition:

$$0 < |EW| < 15 \quad (11)$$

where EW is an angle (°) made by the most off-axis chief ray (a diagonal chief ray) on a diagonal line with the optical axis.

The lens system of the present invention is also applicable to a digital camera which is a photographing device using a solid-state image sensor (hereinafter referred to as CCD). Thus, when the lens system is used in the digital camera, an angle of incidence of a ray of light leaving the last lens surface on the CCD becomes important. If the angle of incidence on the CCD is extremely large, there is the fear that the shortage of the amount of light is caused by grazing incidence. In particular, when an image height is increased, an angle of emergence of the lens system is also increased, and hence the attenuation of ambient light with the CCD becomes prominent. In order to minimize a reduction in the amount of light by the attenuation of ambient light, Condition (11) becomes necessary.

Condition (11) prescribes the limit of the angle made by an emergent diagonal chief ray with the optical axis, that is, the absolute value of the angle of emergence of the diagonal chief ray. The CCD used in the lens system of the present invention is designed to match the characteristic of grazing incidence of the CCD to the lens system. However, in order to keep the attenuation of ambient light caused by the grazing incidence on the CCD to a normal level, it is desirable that the lens system is designed so that the angle of incidence of the diagonal chief ray on the CCD, namely the angle of emergence of the optical system, is not set outside the limit of Condition (11) to be satisfied.

The embodiments of the present invention will be described below.

The optical construction of each of the embodiments of the present invention is such that the image height is 11.1 mm and the pixel pitch of the CCD is 5.5 μm. An optical low-pass filter is interposed between the last lens surface and the image plane.

First Embodiment

Figure 1A:
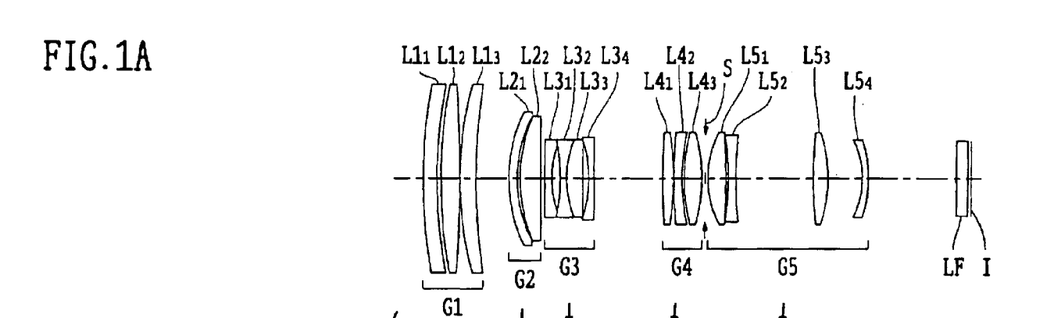
FIGS. 1A, 1B, and 1C are sectional views showing optical arrangements, developed along the optical axis, at wide-angle, middle, and telephoto positions, respectively, in a first embodiment of an imaging device provided with the zoom lens according to the present invention.
Figure 1B:
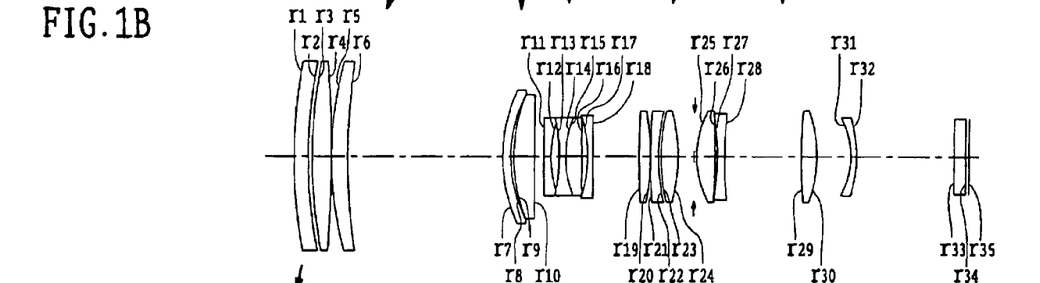
Figure 1C:
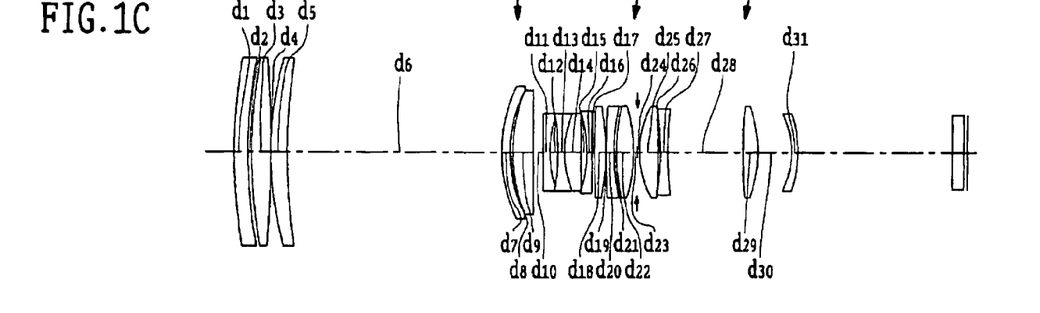

FIGS. 1A, 1B, and 1C show optical arrangements in the first embodiment of the imaging device provided with the zoom lens according to the present invention.

The zoom lens of the first embodiment comprises, in order from the object side, a first lens unit G1, a second lens unit G2, a third lens unit G3, a fourth lens unit G4, and a fifth lens unit G5. Also, in FIG. 1A, reference symbol S represents a stop, LF represents an optical low-pass filter, and I represents the image plane of the CCD.

The first lens unit G1 includes a negative lens $L1_1$, a positive lens $L1_2$, and a positive lens $L1_3$, and has positive power as a whole.

The second lens unit G2 includes a negative lens $L2_1$, and a positive lens $L2_2$, and has positive power as a whole.

The third lens unit G3 includes a negative lens $L3_1$, a positive cemented doublet of a negative lens $L3_2$ and a positive lens $L3_3$, and a negative lens $L3_4$, and has negative power as a whole.

The fourth lens unit G4 includes a positive lens $L4_1$, a negative lens $L4_2$, and a positive lens $L4_3$, and has positive power as a whole.

The fifth lens unit G5 includes a positive lens $L5_1$, a negative lens $L5_2$, a positive lens $L5_3$, and a negative lens $L5_4$, and has positive power as a whole.

When the magnification of the zoom lens is changed, extending from the wide-angle position to the telephoto position, the first lens unit G1 is moved toward the object side, the second lens unit G2 is moved toward the object side with a smaller amount of movement than in the first lens unit G1, the third lens unit G3 remains fixed in position, the fourth lens unit G4 is moved toward the object side, and the fifth lens unit G5 is moved toward the object side so that spacing between the fourth lens unit G4 and the fifth lens unit G5 is widened and then narrowed.

The third lens unit G3, which is the only one negative lens unit, has relatively strong power. Consequently, a manufacturing-error sensitivity is high and there is considerable variation in performance on assembly. In the first embodiment, the third lens unit is fixed during zooming, and thereby variation in performance on assembly is kept to a minimum.

The stop S is interposed between the fourth lens unit G4 and the fifth lens unit G5 and is moved together with the fifth lens unit G5 when the magnification is changed.

Also, focusing is performed by moving the second lens unit G2.

Subsequently, numerical data of optical members constituting the zoom lens of the first embodiment are shown below.

In the numerical data of the first embodiment, $r_1, r_2, \ldots$ denote radii of curvature of surfaces of individual lenses; $d_1, d_2, \ldots$ denote thicknesses of individual lenses or air spacings between them; $n_{d1}, n_{d2}, \ldots$ denote refractive indices of individual lenses at the d line; $v_{d1}, v_{d2}, \ldots$ denote Abbe's numbers of individual lenses; f denotes the focal length of the entire system of the zoom lens; Fno denotes the F-number of the zoom lens; and $2\omega$ denotes the entire angle of view of the zoom lens.

These symbols are also used for the numerical data of other embodiments to be described later.

Numerical data 1

| | | | |
|---|---|---|---|
| $r_1$ = 197.433 | $d_1$ = 4.500 | $n_{d1}$ = 1.84666 | $v_{d1}$ = 23.78 |
| $r_2$ = 134.910 | $d_2$ = 0.500 | | |
| $r_3$ = 113.296 | $d_3$ = 7.800 | $n_{d3}$ = 1.49700 | $v_{d3}$ = 81.54 |
| $r_4$ = −636.535 | $d_4$ = 0.100 | | |
| $r_5$ = 109.529 | $d_5$ = 5.900 | $n_{d5}$ = 1.49700 | $v_{d5}$ = 81.54 |
| $r_6$ = 200.696 | $d_6$ = D6 | | |
| $r_7$ = 52.442 | $d_7$ = 2.880 | $n_{d7}$ = 1.84666 | $v_{d7}$ = 23.78 |
| $r_8$ = 41.772 | $d_8$ = 0.780 | | |
| $r_9$ = 46.434 | $d_9$ = 7.820 | $n_{d9}$ = 1.51633 | $v_{d9}$ = 64.14 |
| $r_{10}$ = 2198.854 | $d_{10}$ = D10 | | |
| $r_{11}$ = −2807.034 | $d_{11}$ = 2.220 | $n_{d11}$ = 1.88300 | $v_{d11}$ = 40.76 |
| $r_{12}$ = 33.949 | $d_{12}$ = 3.475 | | |
| $r_{13}$ = −57.293 | $d_{13}$ = 2.000 | $n_{d13}$ = 1.48749 | $v_{d13}$ = 70.23 |
| $r_{14}$ = 32.774 | $d_{14}$ = 5.550 | $n_{d14}$ = 1.84666 | $v_{d14}$ = 23.78 |
| $r_{15}$ = −212.446 | $d_{15}$ = 2.274 | | |
| $r_{16}$ = −35.934 | $d_{16}$ = 2.000 | $n_{d16}$ = 1.77250 | $v_{d16}$ = 49.60 |
| $r_{17}$ = −31419.280 | $d_{17}$ = D17 | | |
| $r_{18}$ = 325.474 | $d_{18}$ = 4.120 | $n_{d18}$ = 1.69680 | $v_{d18}$ = 55.53 |
| $r_{19}$ = −65.813 | $d_{19}$ = 0.123 | | |
| $r_{20}$ = 652.873 | $d_{20}$ = 2.660 | $n_{d20}$ = 1.80610 | $v_{d20}$ = 40.92 |
| $r_{21}$ = 54.501 | $d_{21}$ = 0.400 | | |
| $r_{22}$ = 53.140 | $d_{22}$ = 6.500 | $n_{d22}$ = 1.49700 | $v_{d22}$ = 81.54 |
| $r_{23}$ = −53.140 | $d_{23}$ = D23 | | |
| $r_{24}$ = ∞ (Stop surface) | $d_{24}$ = 1.290 | | |
| $r_{25}$ = 32.667 | $d_{25}$ = 6.320 | $n_{d25}$ = 1.49700 | $v_{d25}$ = 81.54 |
| $r_{26}$ = −476.751 | $d_{26}$ = 1.310 | | |
| $r_{27}$ = −68.377 | $d_{27}$ = 2.620 | $n_{d27}$ = 1.64769 | $v_{d27}$ = 33.79 |
| $r_{28}$ = 120.985 | $d_{28}$ = 26.966 | | |
| $r_{29}$ = 141.279 | $d_{29}$ = 5.010 | $n_{d29}$ = 1.65160 | $v_{d29}$ = 58.55 |
| $r_{30}$ = −50.112 | $d_{30}$ = 12.344 | | |
| $r_{31}$ = −28.150 | $d_{31}$ = 1.880 | $n_{d31}$ = 1.83481 | $v_{d31}$ = 42.72 |
| $r_{32}$ = −48.734 | $d_{32}$ = D32 | | |
| $r_{33}$ = ∞ | $d_{d33}$ = 4.000 | $n_{d33}$ = 1.51633 | $v_{d33}$ = 64.14 |
| $r_{34}$ = ∞ | $d_{34}$ = D34 | | |

$r_{35}$ = Image plane

Zoom data

| | Wide-angle position | Middle position | Telephoto position |
|---|---|---|---|
| f (mm) | 52.500 | 101.126 | 202.556 |
| Fno | 2.850 | 2.920 | 3.550 |
| $2\omega$ (°) | 24.4 | 12.5 | 6.2 |
| D6 (mm) | 12.058 | 56.760 | 77.751 |
| D10 | 1.080 | 3.436 | 3.693 |
| D17 | 25.469 | 16.370 | 1.000 |
| D23 | 1.000 | 5.909 | 1.000 |
| D32 | 30.765 | 30.956 | 55.233 |
| D34 | 1.000 | 1.000 | 1.000 |

Second Embodiment

Figure 2A:
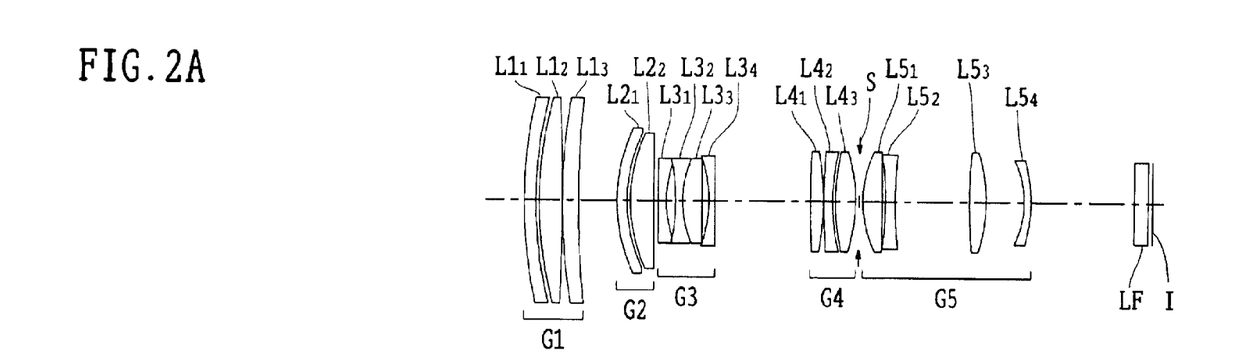
FIGS. 2A, 2B, and 2C are sectional views showing optical arrangements, developed along the optical axis, at wide-angle, middle, and telephoto positions, respectively, in a second embodiment of an imaging device provided with the zoom lens according to the present invention.
Figure 2B:
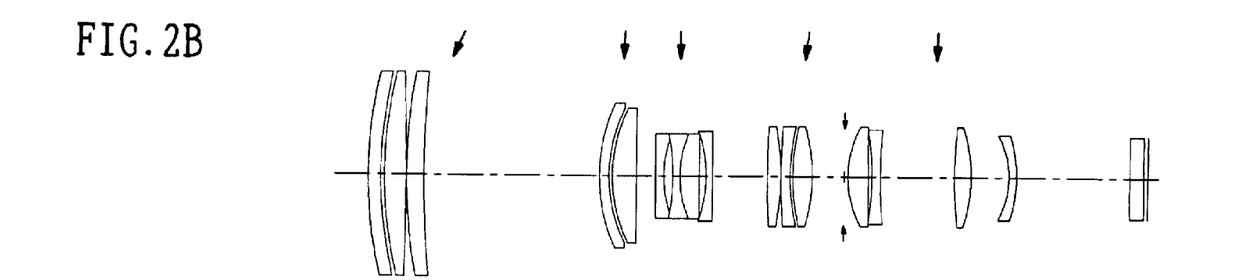
Figure 2C:
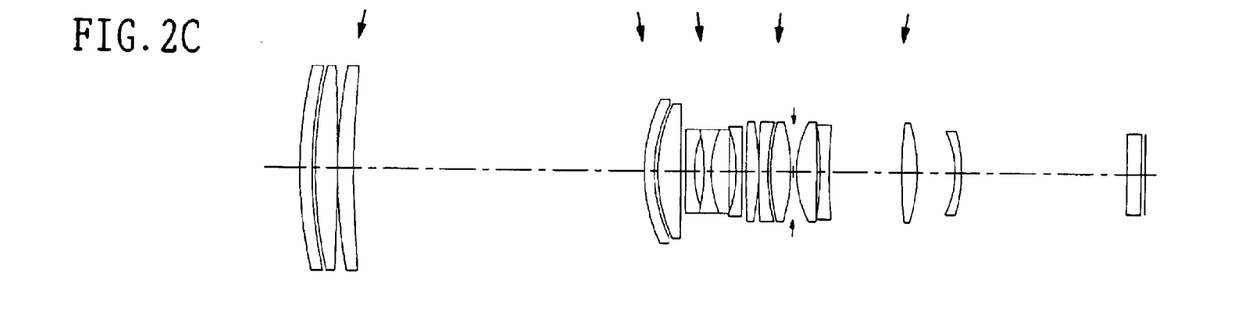

FIGS. 2A, 2B, and 2C show optical arrangements in the second embodiment of the imaging device provided with the zoom lens according to the present invention.

The lens configuration of the zoom lens of the second embodiment is almost the same as that of the zoom lens of the first embodiment.

The zoom lens of the second embodiment is designed to move all of individual lenses in such a way that when the magnification of the zoom lens is changed, extending from the wide-angle position to the telephoto position, the first lens unit G1 is moved toward the object side, the second lens unit G2 is moved toward the object side and then toward the image side, the third lens unit G3 is moved toward the object side so that spacing between the second lens unit G2 and the third lens unit G3 is widened and then is moved toward the image side so that the spacing is narrowed, the fourth lens unit G4 is moved toward the object side, and the fifth lens unit G5 is moved toward the object side so that spacing between the fourth lens unit G4 and the fifth lens unit G5 is widened and then narrowed.

Also, focusing, as in the first embodiment, is performed by moving the second lens unit G2.

Subsequently, numerical data of optical members constituting the zoom lens of the second embodiment are shown below.

Numerical data 2

| | | | |
|---|---|---|---|
| $r_1$ = 134.352 | $d_1$ = 3.880 | $n_{d1}$ = 1.84666 | $v_{d1}$ = 23.78 |
| $r_2$ = 102.269 | $d_2$ = 0.500 | | |
| $r_3$ = 98.299 | $d_3$ = 7.320 | $n_{d3}$ = 1.49700 | $v_{d3}$ = 81.54 |
| $r_4$ = −2404.845 | $d_4$ = 0.100 | | |
| $r_5$ = 152.702 | $d_5$ = 5.550 | $n_{d5}$ = 1.49700 | $v_{d5}$ = 81.54 |
| $r_6$ = 284.317 | $d_6$ = D6 | | |
| $r_7$ = 53.171 | $d_7$ = 2.880 | $n_{d7}$ = 1.84666 | $v_{d7}$ = 23.78 |
| $r_8$ = 39.727 | $d_8$ = 0.780 | | |
| $r_9$ = 41.809 | $d_9$ = 7.820 | $n_{d9}$ = 1.51633 | $v_{d9}$ = 64.14 |
| $r_{10}$ = −2325.181 | $d_{10}$ = D10 | | |
| $r_{11}$ = −1241.062 | $d_{11}$ = 2.220 | $n_{d11}$ = 1.88300 | $v_{d11}$ = 40.76 |
| $r_{12}$ = 34.009 | $d_{12}$ = 3.355 | | |
| $r_{13}$ = −85.209 | $d_{13}$ = 2.000 | $n_{d13}$ = 1.48749 | $v_{d13}$ = 70.23 |
| $r_{14}$ = 31.029 | $d_{14}$ = 5.550 | $n_{d14}$ = 1.84666 | $v_{d14}$ = 23.78 |
| $r_{15}$ = −300.286 | $d_{15}$ = 1.937 | | |
| $r_{16}$ = −39.205 | $d_{16}$ = 2.000 | $n_{d16}$ = 1.74320 | $v_{d16}$ = 49.34 |
| $r_{17}$ = −7498.725 | $d_{17}$ = D17 | | |
| $r_{18}$ = 1994.631 | $d_{18}$ = 4.120 | $n_{d18}$ = 1.69680 | $v_{d18}$ = 55.53 |
| $r_{19}$ = −79.281 | $d_{19}$ = 0.117 | | |
| $r_{20}$ = 73665.518 | $d_{20}$ = 2.660 | $n_{d20}$ = 1.80610 | $v_{d20}$ = 40.92 |
| $r_{21}$ = 62.335 | $d_{21}$ = 0.400 | | |
| $r_{22}$ = 58.368 | $d_{22}$ = 6.500 | $n_{d22}$ = 1.49700 | $v_{d22}$ = 81.54 |
| $r_{23}$ = −51.128 | $d_{23}$ = D23 | | |

-continued

| | | | |
|---|---|---|---|
| $r_{24} = \infty$ (stop surface) | $d_{24} = 1.290$ | | |
| $r_{25} = 30.757$ | $d_{25} = 6.320$ | $n_{d25} = 1.49700$ | $v_{d25} = 81.54$ |
| $r_{26} = -554.797$ | $d_{26} = 1.355$ | | |
| $r_{27} = -66.122$ | $d_{27} = 2.680$ | $n_{d27} = 1.64769$ | $v_{d27} = 33.79$ |
| $r_{28} = 175.835$ | $d_{28} = 22.961$ | | |
| $r_{29} = 188.147$ | $d_{29} = 5.010$ | $n_{d29} = 1.65160$ | $v_{d29} = 58.55$ |
| $r_{30} = -45.511$ | $d_{30} = 11.344$ | | |
| $r_{31} = -25.293$ | $d_{31} = 1.880$ | $n_{d31} = 1.83481$ | $v_{d31} = 42.72$ |
| $r_{32} = -47.490$ | $d_{32} = D32$ | | |
| $r_{33} = \infty$ | $d_{33} = 4.000$ | $n_{d33} = 1.51633$ | $v_{d33} = 64.14$ |
| $r_{34} = \infty$ | $d_{34} = D34$ | | |
| $r_{35}$ = Image plane | | | |

Zoom data

| | Wide-angle position | Middle position | Telephoto position |
|---|---|---|---|
| f (mm) | 52.495 | 101.313 | 202.528 |
| Fno | 2.850 | 2.920 | 3.550 |
| 2ω (°) | 24.4 | 12.5 | 6.2 |
| D6 (mm) | 12.271 | 54.838 | 90.856 |
| D10 | 1.080 | 5.365 | 1.494 |
| D17 | 31.006 | 18.870 | 1.000 |
| D23 | 1.000 | 9.958 | 1.000 |
| D32 | 31.646 | 35.294 | 51.020 |
| D34 | 1.000 | 1.000 | 1.000 |

Third Embodiment

Figure 3A:
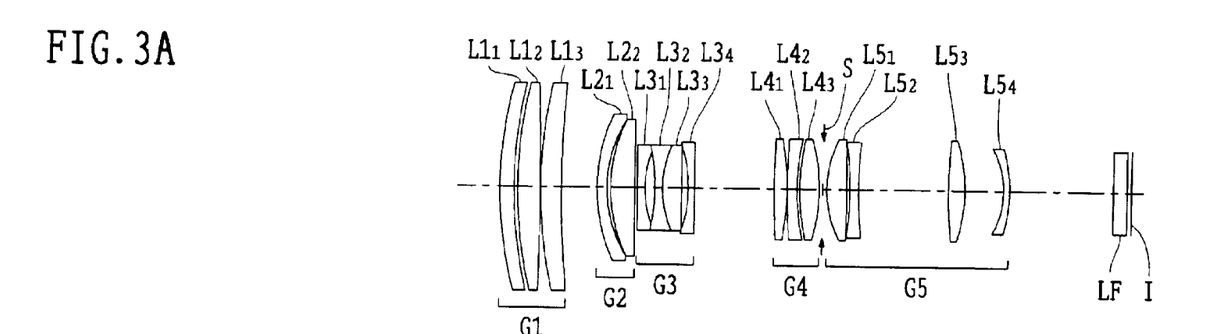
FIGS. 3A, 3B, and 3C are sectional views showing optical arrangements, developed along the optical axis, at wide-angle, middle, and telephoto positions, respectively, in a third embodiment of an imaging device provided with the zoom lens according to the present invention.
Figure 3B:
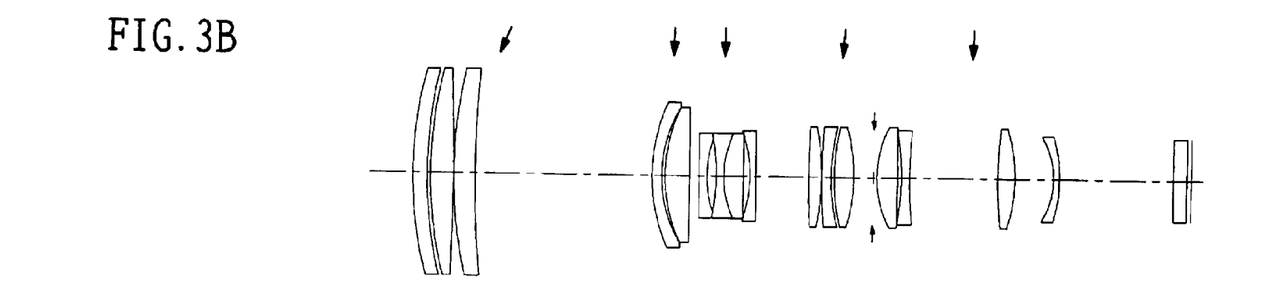
Figure 3C:
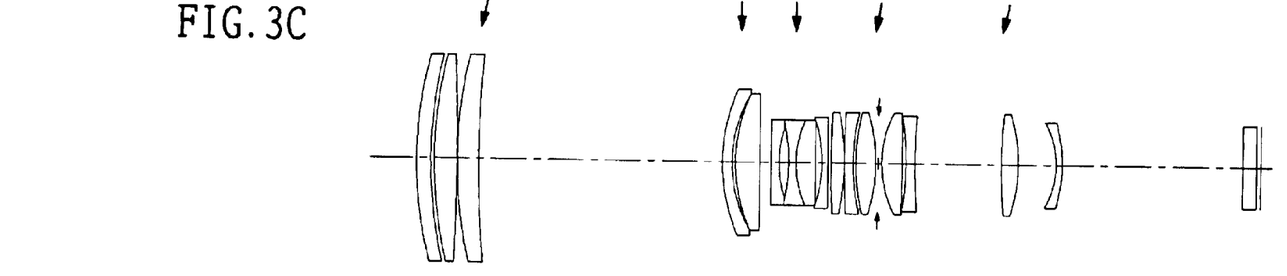

FIGS. 3A, 3B, and 3C show optical arrangements in the third embodiment of the imaging device provided with the zoom lens according to the present invention.

The lens configuration of the zoom lens of the third embodiment is almost the same as that of the zoom lens of the first embodiment.

The behavior of individual lenses where the magnification is changed is also the same as in the case of the first embodiment, and the third lens unit G3 remains fixed. Also, focusing, as in the first embodiment, is performed by the second lens unit G2.

Subsequently, numerical data of optical members constituting the zoom lens of the third embodiment are shown below.

Numerical data 3

| | | | |
|---|---|---|---|
| $r_1 = 144.917$ | $d_1 = 4.500$ | $n_{d1} = 1.84666$ | $v_{d1} = 23.78$ |
| $r_2 = 106.988$ | $d_2 = 0.500$ | | |
| $r_3 = 97.833$ | $d_3 = 7.880$ | $n_{d3} = 1.49700$ | $v_{d3} = 81.54$ |
| $r_4 = -1064.379$ | $d_4 = 0.100$ | | |
| $r_5 = 125.667$ | $d_5 = 5.900$ | $n_{d5} = 1.48749$ | $v_{d5} = 70.23$ |
| $r_6 = 227.310$ | $d_6 = D6$ | | |
| $r_7 = 54.408$ | $d_7 = 2.880$ | $n_{d7} = 1.84666$ | $v_{d7} = 23.78$ |
| $r_8 = 42.045$ | $d_8 = 0.441$ | | |
| $r_9 = 45.198$ | $d_9 = 7.583$ | $n_{d9} = 1.51633$ | $v_{d9} = 64.14$ |
| $r_{10} = 2046.151$ | $d_{10} = D10$ | | |
| $r_{11} = -655.523$ | $d_{11} = 2.220$ | $n_{d11} = 1.88300$ | $v_{d11} = 40.76$ |
| $r_{12} = 33.090$ | $d_{12} = 3.303$ | | |
| $r_{13} = -67.278$ | $d_{13} = 2.000$ | $n_{d13} = 1.48749$ | $v_{d13} = 70.23$ |
| $r_{14} = 31.144$ | $d_{14} = 5.550$ | $n_{d14} = 1.84666$ | $v_{d14} = 23.78$ |
| $r_{15} = -261.694$ | $d_{15} = 2.005$ | | |
| $r_{16} = -35.593$ | $d_{16} = 2.000$ | $n_{d16} = 1.77250$ | $v_{d16} = 49.60$ |
| $r_{17} = -971.185$ | $d_{17} = D17$ | | |
| $r_{18} = 153.448$ | $d_{18} = 4.120$ | $n_{d18} = 1.69680$ | $v_{d18} = 55.53$ |
| $r_{19} = -80.673$ | $d_{19} = 0.123$ | | |
| $r_{20} = 343.299$ | $d_{20} = 2.660$ | $n_{d20} = 1.80610$ | $v_{d20} = 40.92$ |
| $r_{21} = 50.791$ | $d_{21} = 0.500$ | | |
| $r_{22} = 54.806$ | $d_{22} = 6.500$ | $n_{d22} = 1.49700$ | $v_{d22} = 81.54$ |
| $r_{23} = -54.806$ | $d_{23} = D23$ | | |
| $r_{24} = \infty$ (Stop surface) | $d_{24} = 1.290$ | | |
| $r_{25} = 34.940$ | $d_{25} = 6.320$ | $n_{d25} = 1.49700$ | $v_{d25} = 81.54$ |
| $r_{26} = -179.799$ | $d_{26} = 0.928$ | | |
| $r_{27} = -68.958$ | $d_{27} = 2.620$ | $n_{d27} = 1.64769$ | $v_{d27} = 33.79$ |
| $r_{28} = 121.068$ | $d_{28} = 28.111$ | | |
| $r_{29} = 141.931$ | $d_{29} = 5.010$ | $n_{d29} = 1.65160$ | $v_{d29} = 58.55$ |
| $r_{30} = -49.033$ | $d_{30} = 11.765$ | | |
| $r_{31} = -28.987$ | $d_{31} = 1.880$ | $n_{d31} = 1.83481$ | $v_{d31} = 42.72$ |
| $r_{32} = -53.512$ | $d_{32} = D32$ | | |
| $r_{33} = \infty$ | $d_{33} = 4.000$ | $n_{d33} = 1.51633$ | $v_{d33} = 64.14$ |
| $r_{34} = \infty$ | $d_{34} = D34$ | | |
| $r_{35}$ = Image plane | | | |

Zoom data

| | Wide-angle position | Middle position | Telephoto position |
|---|---|---|---|
| f (mm) | 52.468 | 101.227 | 202.201 |
| Fno | 2.800 | 2.932 | 3.629 |
| 2ω (°) | 24.4 | 12.5 | 6.2 |
| D6 (mm) | 12.641 | 56.311 | 75.231 |
| D10 | 1.080 | 4.039 | 5.286 |
| D17 | 25.398 | 16.644 | 1.000 |
| D23 | 1.000 | 5.932 | 1.000 |
| D32 | 30.910 | 34.733 | 55.298 |
| D34 | 1.000 | 1.000 | 1.000 |

Subsequently, values of the conditions in the above embodiments are listed in Table 1.

TABLE 1

| | 1st embodiment | 2nd embodiment | 3rd embodiment |
|---|---|---|---|
| Condition (1) f1/fw | 3.610 | 3.941 | 3.629 |
| Condition (2) f2/fw | 2.707 | 2.561 | 2.785 |
| Condition (3) f3/ft | −0.109 | −0.125 | −0.110 |
| Condition (4) f4/ft | 0.284 | 0.348 | 0.287 |
| Condition (5) f5/fw | 1.993 | 1.927 | 1.939 |
| Condition (6) F | 2.8–3.5 | 2.8–3.5 | 2.8–3.5 |
| Condition (7) MG | −0.254 | −0.250 | −0.255 |
| Condition (8) Δd/ft | 0.100 | 0.105 | 0.102 |
| Condition (9) IH | 11.14 | 11.14 | 11.14 |
| Condition (10) fb/IH | 3.210 | 3.290 | 3.223 |
| Condition (11) |EW| | 5.8–7.4 | 6.6–8.3 | 5.8–7.4 |

Figure 4:
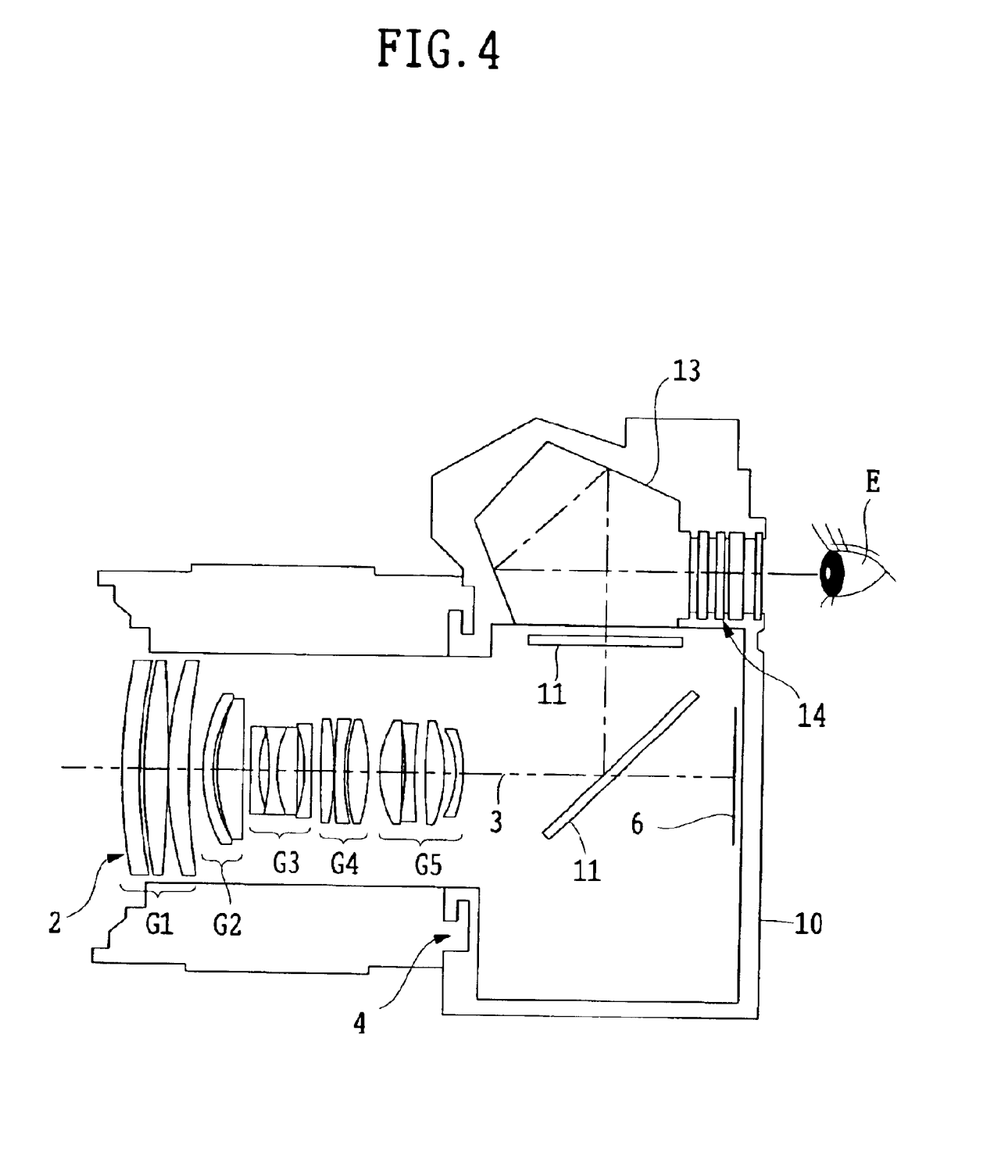
FIG. 4 s a view showing schematically the construction of an example of a silver halide film-type single-lens reflex camera using the zoom lens of the present invention as a photographic lens.

Subsequently, an example of a silver halide film-type single-lens reflex camera using the zoom lens of the present invention as a photographic lens is shown in FIG. 4.

In FIG. 4, reference numeral 10 designates a single-lens reflex camera, 2 designates a photographic lens, and 4 designates a mount enabling the photographic lens to be mounted to, and removed from, the single-reflex camera 10. The mount of a screw or bayonet type is used (in FIG. 4, the bayonet type is used). Reference numeral 6 designates a film, 11 designates a quick-return mirror interposed between the photographic lens 2 and the film 6 on an optical path 3 of the photographic lens 2, 12 designates a finder screen placed on an optical path reflected by the quick-return mirror 11, 13 designates a pentaprism, and 14 designates a finder. Reference symbol E represents an observer's eye (eyepoint). Also, an exposure-time adjusting shutter, although not shown in FIG. 4, may be placed immediately before the film.

The zoom lens of the present invention shown in each of the embodiments is used as the photographic lens 2 of the single-lens reflex camera 10 constructed as mentioned above.

According to the camera provided with the zoom lens of the present invention shown in FIG. 4, the lens-mountable and removable mount 4 is provided, and thus when the camera is stored, the zoom lens 2 can be dismounted from the camera so that a storing space can be effectively used. In photography, the zoom lens 2 of the present invention can be mounted to the camera as occasion demands. In this camera, the back focal length is ensured by the zoom lens 2. Whereby, the quick-return mirror 11 is placed, and when photographing is not performed, a light beam is reflected upward by the quick-return mirror 11 to form an image on the finder screen 12.

The image formed on the finder screen 12 is transmitted rearward by the pentaprism 13, and the transmitted image is observed with the observer's eye which is situated at the eyepoint E created by the finder 14.

In photography, the quick-return mirror 11 springs back, and the image is formed on the film 6 placed behind the zoom lens 2. In this way, photographing is performed.

The camera of FIG. 4 may be constructed as a digital camera in which the solid-state image sensor (CCD) is used instead of the film. In this case, a low-pass filter or an infrared cutoff filter may be interposed between the lens and the solid-state image sensor. Instead of the quick-return mirror placed on the side of the back focal length of the lens, a beam splitter, such as a half-mirror prism, may be used as a reflecting member which is capable of separating light into a finder optical path and a photographing optical path. In this construction, since there is no moving part, durability is improved and cost advantages are offered.

What is claimed is:

1. A zoom lens comprising, in order from an object side:
   a first lens unit with positive power;
   a second lens unit with positive power;
   a third lens unit with negative power;
   a fourth lens unit with positive power; and
   a fifth lens unit with positive power,
   wherein when a magnification of the zoom lens is varied, extending from a wide angle position to a telephoto position, the first lens unit is moved and a spacing between the first lens unit and the second lens unit, a spacing between the second lens unit and the third lens unit, a spacing between the third lens unit and the fourth lens unit, and a spacing between the fourth lens unit and the fifth lens unit are changed.

2. A zoom lens comprising, in order from an object side:
   a first lens unit with positive power;
   a second lens unit with positive power; and
   a third lens unit with negative power,
   wherein when a magnification of the zoom lens is varied, extending from a wide angle position to a telephoto position, spacings between the first lens unit and the second lens unit and between the second lens unit and the third lens unit become wider at the telephoto position than at the wide-angle position, and the third lens unit remains fixed, wherein the zoom lens comprises, in order from the object side, the first lens unit with positive power; the second lens unit with positive power; the third lens unit with negative power; a fourth lens unit with positive power; and a fifth lens unit with positive power, and when the magnification of the zoom lens is varied, extending from the wide-angle position to the telephoto position, the spacing between the first lens unit and the second lens unit, the spacing between the second lens unit and the third lens unit, a spacing between the third lens unit and the fourth lens unit, and a spacing between the fourth lens unit and the fifth lens unit are changed.

3. A zoom lens according to claim 1, wherein the second lens unit is moved toward the object side to thereby perform focusing.

4. A zoom lens according to claim 1 or 2, satisfying the following conditions:

$$0.1 < f4/ft < 0.4$$

$$1.5 < f5/fw < 2.5$$

where f4 is a focal length of the fourth lens unit, f5 is a focal length of the fifth lens unit, fw is a focal length of an entire system at the wide-angle position, and ft is a focal length of the entire system at the telephoto position.

5. A zoom lens according to claim 1, satisfying the following condition:

$$3 < f1/fw < 5$$

where fi is a focal length of the first lens unit and fw is a focal length of an entire system at the wide-angle position.

6. A zoom lens according to claim 1, satisfying the following condition:

$$2 < f2/fw < 3.5$$

where f2 is a focal length of the second lens unit and fw is a focal length of an entire system at the wide-angle position.

7. A zoom lens according to claim 1, satisfying the following condition:

$$-0.16 < f3/ft < -0.08$$

where f3 is a focal length of the third lens unit and ft is a focal length of an entire system at the telephoto position.

8. A zoom lens according to claim 1, satisfying the following condition:

$$2.0 < F < 4.0$$

where F is an F-number.

9. A zoom lens according to claim 1, satisfying the following condition:

$$-0.35 \leq MG \leq -0.15$$

where MG is a maximum magnification for photography.

10. A zoom lens according to claim 3, satisfying the following condition:

$$0.08 < \Delta d/ft < 0.12$$

where $\Delta d$ is an amount of movement in focusing extending from infinity to a nearest object point and ft is a focal length of an entire system at the telephoto position.

11. A zoom lens according to claim 1, satisfying the following conditions:

$$10 < IH < 13$$

$$2.8 < fb/IH < 3.8$$

where IH is a radius of an image circle and fb is a distance from a last lens surface to an image plane at the wide-angle position.

12. A zoom lens according to claim 1, satisfying the following condition:

$$0 < |EW| < 15$$

where EW is an angle in degrees made by the most off-axis chief ray on a diagonal line or a diagonal chief ray with an optical axis.

13. A zoom lens according to claim 1, wherein a mount that permits removable mounting of the zoom lens on a camera body is provided.

* * * * *